United States Patent [19]

Kelbel

[11] 4,012,968
[45] Mar. 22, 1977

[54] SPEED-SENSITIVE DIFFERENTIAL MECHANISM

[75] Inventor: Donald W. Kelbel, Muncie, Ind.

[73] Assignee: Borg-Warner Corporation, Chicago, Ill.

[22] Filed: Dec. 23, 1974

[21] Appl. No.: 535,596

[52] U.S. Cl. .............................. 74/711; 192/85 AA
[51] Int. Cl.$^2$ ................... F16H 1/44; F16D 25/00
[58] Field of Search .................. 74/711, 710.5; 180/24.09, 44 F; 192/57, 85 AA; 60/D10

[56] References Cited

UNITED STATES PATENTS

| | | | |
|---|---|---|---|
| 2,213,836 | 9/1940 | Gaddoni | 192/57 |
| 2,913,928 | 11/1959 | Double | 74/710.5 |
| 3,393,583 | 7/1968 | Mueller | 74/711 |
| 3,490,312 | 1/1970 | Seitz et al. | 74/711 |
| 3,686,976 | 8/1972 | Philippi | 74/711 |
| 3,724,289 | 4/1973 | Kennicutt | 74/711 |
| 3,752,280 | 8/1973 | Cheek | 192/57 X |
| 3,818,781 | 6/1974 | Goscenski, Jr. | 74/711 |

FOREIGN PATENTS OR APPLICATIONS 725,432   1/1966   Canada .................................. 192/57

*Primary Examiner*—Samuel Scott
*Assistant Examiner*—Lance W. Chandler
*Attorney, Agent, or Firm*—Robert L. Zieg

[57] ABSTRACT

A limited slip differential mechanism of the speedsensitive type having a rotatable casing and gearing supported within the casing adapted to drive a pair of relatively rotatable output elements including a friction clutch mechanism associated with the gearing and the casing to resist relative rotation. The limited slip differential includes an actuator for the clutches, the actuator being associated with a fluid pump mechanism and the fluid pump mechanism being mounted within the actuator. The fluid pump is carried by the actuator and has an input or drive shaft driveable by a side gear of the differential and the actuator is carried by the casing whereby relative rotation between the casing and the side gear will create fluid pressure to activate the actuator and apply the clutch to resist relative rotation.

8 Claims, 3 Drawing Figures

SPEED-SENSITIVE DIFFERENTIAL MECHANISM

BACKGROUND OF THE INVENTION

Prior art devices relating to limited slip differential mechanisms of the speed-sensitive type are well known. In particular, it is known to provide a fluid pump structure within the differential mechanism which will operate in a speed sensitive manner to resist relative rotation. Many of the known prior art devices incorporate pumping structures and a means to block the output of the pump in response to speed difference which tends to resist relative differential action. These devices have proved unsatisfactory in that the relative rotation does not seem to provide sufficient pumping action such that the blocking of the outlet is effective to retard differential action except in cases of extremely high speed difference. Further prior art devices are known having speed-sensitive fluid pump mechanisms, but each of these devices tend to have relatively complicated structures which are expensive to manufacture and take up substantial space within the differential mechanism to add the speed-sensitive feature.

SUMMARY OF THE INVENTION

The present invention solves the problems above discussed in connection with prior art devices in that a simple structure provides the speed-sensitive function for a limited slip differential, while at the same time requiring a minimum of structural modification. A fluid pump structure is provided wherein the actuator for the friction clutch is in addition to serving as the actuator for the clutch, the carrier or mounting for the pump mechanism. In addition, the pump is of the "Gerotor" type which is well adapted to a differential environment in that the pump relatively rotating elements can change their direction of relative rotation and still pump fluid in the same direction.

DESCRIPTION OF THE PREFERRED EMBODIMENT

Figure 1:
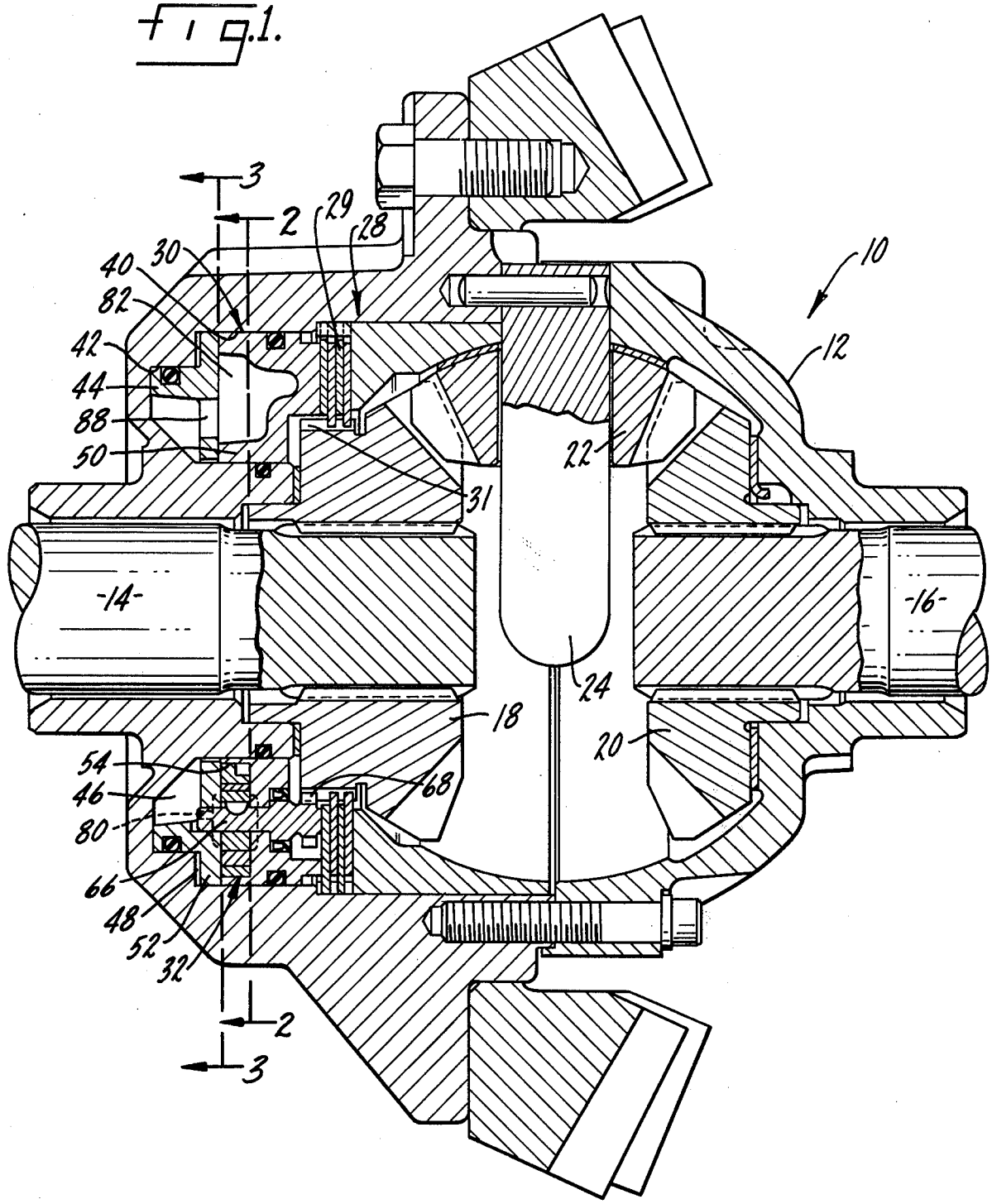
FIG. 1 is a cross-sectional view of a limited slip differential embodying the principles of the invention.

Referring to FIG. 1 there is illustrated a speed-sensitive limited slip differential mechanism 10 which comprises a casing 12 adapted to drive a pair of output shafts or elements 14 and 16. Contained within the casing 12 is a planetary gearing system comprising bevel side gears 18 and 20 splined to the output shafts 14 and 16 respectively. Meshing with the side gears 18 and 20 is a plurality of planetary pinion gears 22 carried by a mounting or cross pin 24 mounted in the casing 12.

A clutch mechanism 28 is provided having alternate of its discs 29 splined to side gear 18 and casing 12, respectively, which when engaged resists differential action. Side gear 18 has splines 31 thereon in mesh with certain of discs 29. A fluid piston or actuator 30 is provided to engage clutch 28.

The differential mechanism 10 may be incorporated as a normal differential installation for the driving axles of a two-wheel drive vehicle or in addition may be adapted for use in a four-wheel drive mechanism as shown in U.S. Pat. No. 3,650,349 and 3,656,573 of common assignee wherein a differential is utilized to transmit torque to front and rear driving axles, respectively.

The differential of the present invention is a speed-sensitive differential in that in response to speed difference, friction clutches are applied to resist relative rotation or differential action between the casing and side gear. The speed-sensitive apparatus included in the present invention comprises a fluid pump or fluid energy generating means 32 within the casing 12. The fluid pump 32 is mounted within actuator 30 and is of the well known Gerotor type. The Gerotor type pump 32 is of the automatically reversible unidirectional flow type which is similar to the pump fully described in U.S. Pat. No. 3,165,006.

The actuator 30 is mounted in a bore 40 in the differential case. A reduced diameter portion 42 of bore 40 is provided. The actuator 30 has a portion 44 extending into bore 42. The actuator 30 together with the bores 40 and 42 defines an inner chamber 46 in the housing which serves as the fluid sump chamber and an outer annular chamber 48, which is the fluid pressure chamber. Pressure in chamber 48 will act on actuator 30 to urge same into engagement with the clutch 28 to engage same.

The pump mechanism 32 is mounted within actuator 30. Actuator 30 is of two-piece construction comprising a body member 50 and a cover member 52. Provided within the body member 50 is a bore 54, which receives the pumping elements.

Figure 2:
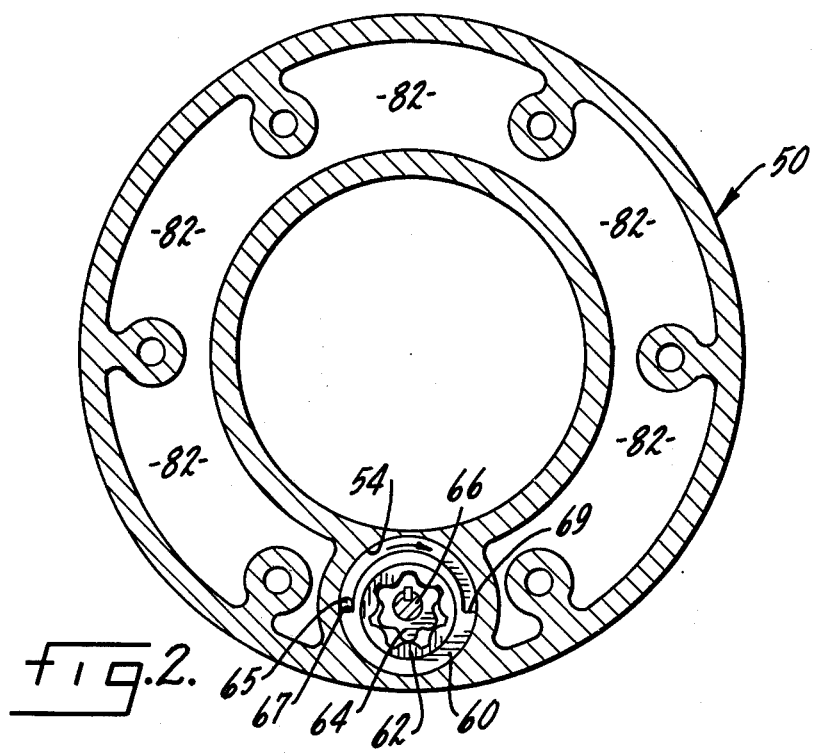
FIG. 2 is a view taken along the lines 2—2 of FIG. 1.
Figure 3:
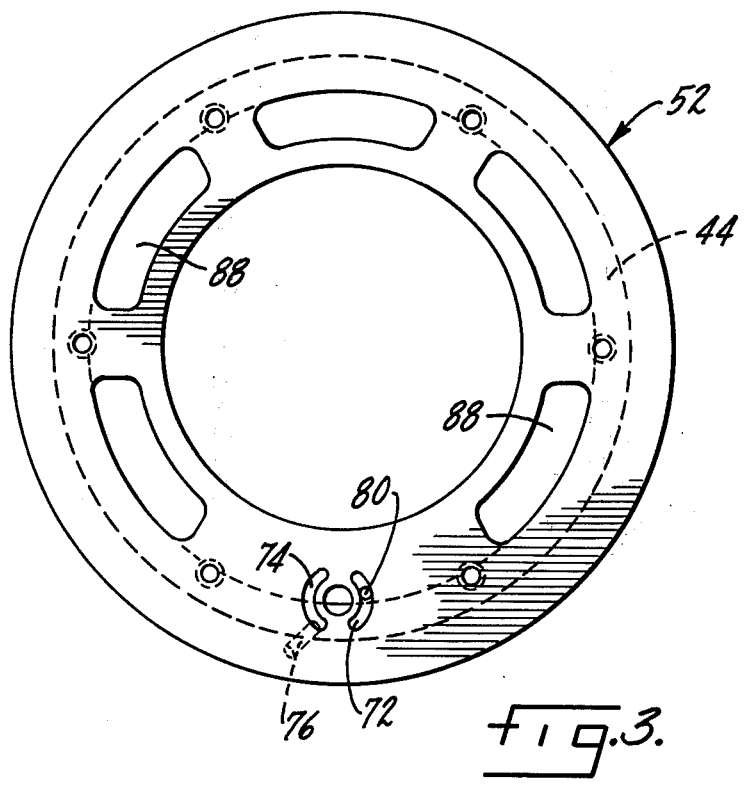
FIG. 3 is a view taken along the lines 3—3 of FIG. 1.

As described above, the pump utilized herein is of the Gerotor type which involves three key elements as best illustrated in FIG. 2, an outer ring 60 having an eccentric bore therein, an outer rotor 62 and an inner rotor 64. The inner rotor has one less tooth than the outer rotor and when the inner rotor is driven it will drive the outer rotor, which can freely rotate within the outer ring 60 thus providing a series of decreasing and increasing volume fluid pockets by means of which fluid pressure is created. Inner rotor 64 is mounted on a drive or pump shaft 66. The shaft 66 is rotatably mounted within the cover member 52 and the body member 50. External to the pump itself, shaft 66 has a drive gear 68 formed thereon. Drive gear 68 meshes with splines 31 of side gear 18. Since the pump 32 is carried by actuator 30 and the actuator 30 rotates with casing 12, when relative motion takes place between casing 12 and side gear 18, the gear 68 will rotate the inner rotor 64 of pump 32 to create fluid pressure. As illustrated in FIG. 3, the pump has a pair of crescent ports, an intake port 72 and a pressure port 74 formed in cover 52. Pressure port 74, by means of passage 76, is in communication with pressure chamber 48, and crescent port 72 is in communication with a sump passage 80. Also formed within the actuator 30 is a series of interconnecting pockets 82 equally distributed around the body member 50 which act as oil reservoirs for the pump 32. The oil in the reservoir 82 is in communication with the chamber 46 by means of a series of matching ports 88 formed in the cover member 52 of actuator 30.

The Gerotor pump 32 is of the reversible type in that a stop pin 65 is provided in the casing, which can be engaged by stops 67 and 69 on the outer ring 60. Assuming the pump is rotating in the direction to maintain stop 67 against pin 65 as shown in FIG. 2, the eccentricity of the pump is such that the meshing of the teeth takes place at the top of the pump as viewed in FIG. 2. When the relative rotation is reversed, the outer ring will move around until the stop 69 hits pin 65, this will be a movement of 180°. When this is accomplished, the eccentricity of the pump is reversed such that the gears will mesh on the lower side of the pump as viewed in FIG. 2. Thus, even though the relative rotation of the pump elements is changed the crescent port 74 will remain the pressure port and the crescent port 72 will remain the intake port. The reversible type of Gerotor pump, as mentioned above, is well known and has been described previously and is described for clarity and an understanding of the present invention.

From the above description, it will be apparent that the operation of the device is that when relative rotation takes place between side gear 18 and casing 12, the drive shaft 66 by means of gear 68 will drive the inner rotor of the pump 32 to draw in fluid from the sump and create fluid pressure which is passed through passage 76 to pressure chamber 48. Pressure in chamber 48 will act on the actuator 30 to create a force urging it toward the clutch mechanism 28 to increase the engaging force on the clutch plates 29 and create resistance to relative rotation or differential action. Therefore, as will be apparent, the present differential design is of the speed-sensitive type providing a limited slip function by applying a friction clutch in response to speed difference. Such activation of a limited slip differential is desirable particularly in four-wheel drive mechanisms wherein a speed-sensitive control of differential action is important, but this structure can also be used as illustrated in FIG. 1 in the normal differential installation.

The use of the Gerotor type pump 32 is important in that the pump can automatically compensate for reverse relative rotation as, described above, so that with relative rotation in either direction which may occur depending on whether side gear 18 is rotating faster or slower than case 12, the resistance to differential action can be maintained. In addition, the present invention has the advantage of providing the speed-sensitive limited slip type differential in which severe space requirements are avoided since the pump is built entirely within the actuator or piston 30 for the clutch of the limited slip differential. A certain amount of additional axial length may be required for the pump, but no increase in diameter is necessary. Further, when the present invention is to be used in a four-wheel drive installation in which shaft 14 may for example be driving the front axle and shaft 16 the rear axle, the direction of relative rotation in which the pump must function will change readily and it is important to have a reversible type pump.

The various features of the invention have been particularly shown and described, however, it should be obvious to one skilled in the art that modifications may be made therein without departing from the scope of the invention.

I claim:
1. A limited slip differential comprising a casing adapted to be rotatably driven, gearing rotatably supported in said casing and adapted for connection with a pair of relatively rotatable output members, friction clutch means associated with said gearing and said casing and actuable to frictionally resist relative rotation between one of said output members and said casing, an actuator in operative association with said clutch means and mounted in said casing, fluid energy generating means within said actuator adapted to create fluid pressure in response to relative rotation between said one output member and said casing, said fluid pressure being applied to said actuator to actuate said friction clutch means wherein said generating means has an input means driven by said one output member and said input means is carried by said actuator.

2. A limited slip differential as claimed in claim 1 wherein said generating means comprises a fluid pump.

3. A limited slip differential as claimed in claim 2 wherein said pump is of the internal-external gear type, the external gear being driven by said input means.

4. A limited slip differential as claimed in claim 1 wherein said actuator comprises an annular piston engagable with said friction clutch means, said piston having a fluid pump mounted therein, and said fluid pump having an input means driven by said one output member.

5. A limited slip differential as claimed in claim 4 wherein said actuator has a series of pockets formed therein which serve as a fluid reservoir.

6. A limited slip differential comprising a casing adapted to be rotatably driven, planetary gearing including a pair of side gears rotatably supported in said casing, said side gears connected to a pair of relatively rotatable output members, friction clutch means associated with one of said side gears and said casing and actuable to frictionally resist relative rotation between one of said output members and said casing, an actuator for said clutch means mounted in said casing, a fluid pump mounted within said actuator adapted to create fluid pressure in response to relative rotation between said one output member and said casing, said fluid pressure being applied to said actuator to actuate said friction clutch means wherein said pump has an input means driven by said side gear and said input means being carried by said actuator.

7. A limited slip differential as claimed in claim 6 wherein said pump is of the internal-external gear type, the external gear being driven by said input means.

8. A limited slip differential as claimed in claim 7 wherein said actuator comprises an annular piston engagable with said friction clutch means, and said piston having a series of pockets therein radially spaced around same which serve as a fluid reservoir for said pump.

* * * * *